Patented Apr. 5, 1949

2,466,420

UNITED STATES PATENT OFFICE

2,466,420

KETENE CONDENSATION PRODUCTS WITH ALDEHYDES

Hugh J. Hagemeyer, Jr., Kingsport, Tenn., assignor to Eastman Kodak Company, Rochester, N. Y., a corporation of New Jersey No Drawing. Application November 26, 1947, Serial No. 788,323

17 Claims. (Cl. 260—344)

This invention relates to the preparation of β-lactones, i. e. lactones of β-hydroxycarboxylic acids, from ketenes and aldehydes.

Staudinger first showed that a keto ketene, such as diphenyl ketene, added to aldehydes or ketones to give β-lactones. Ann. 384, 38–135 (1911) and Ann. 380, 243 (1911). Staudinger also showed the addition of diphenyl ketene to unsaturated ketones, and isolated diolefins from the reaction mixture. Ann. 401, 263 (1913).

Aldo ketenes, on the other hand, are relatively unstable as compared with keto ketenes and dimerize rapidly, under ordinary conditions of temperature and pressure. In the absence of a catalyst, aldo ketenes do not condense with carbonyl compounds, but form the dimer instead. With aldehydes, the ketene dimers react to form unsaturated ketones. See Boese, United States Patent 2,108,427, dated February 15, 1938.

Kung in United States Patent 2,356,459, dated August 22, 1944, has shown that ketene ($CH_2=C=O$) reacts with aldehydes or ketones to give β-lactones, in the presence of Friedel-Crafts type of catalysts.

C. D. Hurd showed that ketene reacts with furfural, benzaldehyde, or m-nitrobenzaldehyde in the presence of anhydrous potassium acetate at about 60° C. to produce a reaction mixture consisting largely of mixed anhydrides of β-substituted acrylic acids ("Jour. Am. Chem. Soc." vol. 55 (1933) pg. 275). Due to the presence of small amounts of olefins in his reaction mixture, Hurd suggested that some β-lactone was formed but that it readily lost carbon dioxide to produce these olefins.

I have now found that, quite unexpectedly, in the presence of at least one carboxylic acid salt of a member selected from the group consisting of barium, calcium, mercury, zinc, nickel, cobalt and copper, ketenes (both aldo and keto ketenes) react with aldehydes to give a reaction mixture containing a substantial portion of β-lactones.

The catalysts of the present process are superior to Friedel-Crafts type of catalyst, since these latter catalysts of the prior art produce undesirable polymerization effects when more reactive aldehydes such as furfural are used. These polymerization effects are largely or entirely avoided in my process. The catalysts which I use also possess certain advantages over that of Hurd in that larger yields can be obtained and the reaction mixture has a minimum of undesirable condensation products. A further advantage in the present process over that of Hurd is that I do not necessarily have to use an anhydrous catalyst as is true of Hurd's process. The economic advantages of a catalyst containing water of hydration over one which must be used in anhydrous form are quite important when large quantities of product are to be produced.

It is accordingly an object of my process to provide an improved process for preparing β-lactones in improved yields. Other objects will become apparent from a consideration of the following description.

In accordance with my invention, I prepare β-lactones by reacting a ketene (either an aldo or a keto ketene) with an aldehyde in the presence of at least one carboxylic acid salt of a member selected from the group consisting of barium, calcium, mercury, zinc, nickel, cobalt, and copper.

The ketenes which are advantageously employed in practicing my invention can be represented by the following general formula:

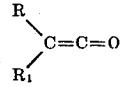

wherein R and $R_1$ each represents a hydrogen atom, an alkyl group (e. g. especially methyl and ethyl groups, i. e. alkyl groups of the formula $C_nH_{2n+1}$ wherein n represents a positive integer of from 1 to 2) or an aryl group (especially a phenyl group, i. e. a $C_6H_5$-group). Although my invention is directed primarily to a process involving ketene ($CH_2=C=O$), any aldo ketene or any keto ketene can be employed. Typical aldo ketenes include ketene, methyl ketene, ethyl ketene, etc. Typical keto ketenes include dimethyl ketene, diethyl ketene, diphenyl ketene, methyl phenyl ketene, etc.

The aldehydes which I can advantageously employ in my invention can be represented by the formula:

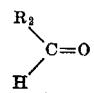

wherein $R_2$ represents a member selected from the group consisting of an aryl group, such as phenyl, o-, m-, and p-tolyl, p-ethylphenyl, p-propylphenyl, 1- and 2-naphthyl, o-, m-, and p-chlorophenyl, o-, m-, and p-hydroxyphenyl, o-, m-, and p-nitrophenyl (i. e. an aryl group having from 6 to 10 carbon atoms), and a heterocyclic group, such as 2-furfuryl, 5-methyl-2-furfuryl, 5-chloro-2-furfuryl, etc. (i. e. a heterocyclic group having a 5-membered ring). Typical aldehydes include benzaldehyde, o-, m-, and p- methylbenzaldehyde, p-ethylbenzaldehyde, p-propylbenzaldehyde, 1-naphthylaldehyde, 2-naphthylaldehyde, o-, m-, and p-chlorobenzaldehyde, o-, m-, and p-hydroxybenzaldehyde, o-, m-, and p-nitrobenzaldehyde, furfural, 5-methyl-2-furfural, 5-chloro-2-furfural, etc. My process is especially useful for the preparation of β-lactones from aldehydes of the above general formula wherein R₂ represents an aryl group or a furfuryl group.

The catalysts which I use in my process are the carboxylic acid salts of a member selected from the group consisting of barium, calcium, mercury, zinc, nickel, cobalt and copper. Both aliphatic and aromatic carboxylic acid salts can be used in my process, although the salts of aliphatic carboxylic acids have been found to be especially useful. The acids from which these salts can be prepared can be represented by the formula:

$$R_3—COOH$$

wherein R₃ represents a member selected from the group consisting of an alkyl group, such as methyl, ethyl, n-propyl, isopropyl (i. e. an alkyl group having the formula $C_nH_{2n+1}$ where $n$ is a positive integer from 1 to 3) and an aryl group, such as phenyl, o-, m-, and p-tolyl. Typical are barium acetate, calcium acetate, mercuric acetate, zinc acetate, nickel acetate, cobalt acetate, copper acetate, barium propionate, calcium propionate, mercuric propionate, zinc propionate, nickel propionate, cobalt propionate, copper propionate, barium butyrate, calcium butyrate, zinc butyrate, copper butyrate, nickel butyrate, barium isobutyrate, calcium isobutyrate, copper isobutyrate, cobalt isobutyrate, barium benzoate, calcium benzoate, mercuric benzoate, zinc benzoate, nickel benzoate, cobalt benzoate, copper benzoate, etc. All of these catalysts with the exception of cobalt isobutyrate and nickel butyrate have been previously described in the literature. These two catalysts were conveniently prepared by the well-known method of heating the metal carbonate with the appropriate carboxylic acid, and evaporating the mixture to dryness. Catalysts prepared in this manner usually contained some water of hydration.

The quantity of catalyst employed has a profound effect on the yields which are obtained in my process. In the process of Hurd, where catalyst concentrations of around 6 per cent were used, little or no β-lactone was formed. For example, the lactone of β-(m-nitrophenyl)-β-hydroxypropionic acid, if formed in the process of Hurd, would be expected to be relatively stable (Prausnitz—"Berichte," vol. 17 (1884) pg. 597), but none was detected in the reaction mixture. Advantageously I use a catalyst concentration of from 0.1 to 3 per cent by weight based on the total weight of ketene and aldehyde reactants. No more than a 3 per cent catalyst concentration should be used since the yields are materially lowered when concentrations exceeding this limit are employed. The yields have been found to be especially high when the concentration of catalyst is kept within the range of from 0.3 per cent to 2 per cent by weight based on the total weight of the ketene and aldehyde used.

Advantageously my new process can be carried out in an inert solvent for the reactants, i. e. an organic liquid which dissolves both the ketene and the aldehyde. Suitable solvents include the dialkyl ethers which are liquid at 10° C., e. g. diethyl ether, ethyl isopropyl ether, diisopropyl ether, ethyl n-butyl ether, methyl n-propyl ether, etc., cyclic ethers which are liquid at 10° C., e. g. 1,4-dioxane, chlorinated hydrocarbons which are liquid at 10° C., e. g. chloroform, carbon tetrachloride, ethylidene dichloride, ethylene dichloride, etc., hydrocarbons which are liquid at 10° C., e. g. benzene, toluene, xylene, n-heptane, etc. The β-lactones, themselves, are excellent solvents in which my process can be performed, and the lactone so used need not correspond to the lactone being formed. However, for practical purposes, it is desired to produce a relatively pure lactone, and a lactone corresponding to the lactone being formed is used. If the lactone is to be used in the preparation of synthetic resins, polymers, etc., it may be desired to produce a lactone mixture, since such a mixture can be used directly without purification.

The temperature of my process can be varied and optimum ranges are usually a function of the reactants employed. Advantageously I can use a temperature of from 30–60° C., although slightly lower or higher temperatures can be used if desired. Temperatures substantially lower than 30° C. tend to favor polymerization of the ketenes to produce diketenes, while temperatures substantially higher than 60° C. tend to cause premature loss of carbon dioxide by the β-lactones formed, hence my process is especially advantageous when temperatures of about 30–60° C. are used.

The process of my invention can be carried out batchwise or continuously (e. g. in the continuous manner described in the copending application of Hugh J. Hagemeyer, Jr. and Delmer C. Cooper, Serial No. 660,286, filed April 6, 1946). Where ketene ($CH_2=C=O$) is prepared by the catalytic pyrolysis of acetic acid at reduced pressures, it is advantageous to carry out the process at reduced pressure in a scrubber-type reactor, e. g. ketene and furfural can be reacted at reduced pressure in a scrubber-type reactor (in the manner described in the copending application of Herbert G. Stone, Serial No. 660,285, filed April 6, 1946), using a suitable solvent and a carboxylic acid salt as catalyst.

The mechanism of my process can be illustrated by the following equation:

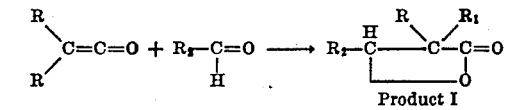

where R, R₁, and R₂ have the meanings set forth above. Thus, the process of my invention produces a reaction mixture consisting largely of a β-lactone, although when a temperature of about 40–60° C. is employed a small portion of the β-lactone formed may polymerize to a lactone polymer which depolymerizes under the condition of the reaction to give an α, β-unsaturated acid. The process of Hurd on the other hand leads to the formation of a reaction mixture containing a large portion of a mixed acid anhydride with little or no formation of a β-lactone. The process of Hurd therefore can be more accurately described as a Perkin-type reaction which leads to the formation of a mixed acid anhydride, while the process of my invention leads to the formation of β-lactone instead.

The following examples will serve to illustrate further the manner of practicing my invention.

*Example I.—β-(2-furyl)-β-propionolactone*

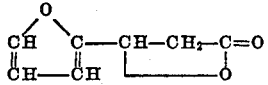

A solution of 1 gm. of nickel butyrate (prepared by heating nickel carbonate with butyric acid, and evaporating the mixture of dryness) in 200 gms. of furfural was prepared, and ketene ($CH_2$=C=O) was passed into the solution slowly until a total of 2 moles had been added. The reaction was found to be sufficiently exothermic to maintain a temperature of 30–40° C. during the addition of the ketene. The reaction mixture was found to consist largely of β-(2-furyl)-β-propionolactone. As a measure of the β-lactone produced, the reaction mixture was distilled at atmospheric pressure, and 30 gms. of 2-vinyl furan were obtained. The vinyl furan resulted from the loss of carbon dioxide by the lactone when heated under atmospheric pressure.

*Example II.—β-(2-furyl)-β-propionolactone*

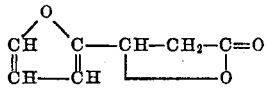

A solution of 1 gm. of barium acetate was prepared, and ketene was passed into the solution through a high speed stirrer while the temperature of the contents of the reaction vessel was maintained at 45° C. After a total of 2 moles of ketene had been passed into the solution, a reaction mixture which consisted primarily of β-(2-furyl)-β-propionolactone was obtained. As a measure of the amount of β-lactone produced, the reaction mixture was distilled at atmospheric pressure, and the β-lactone lost carbon dioxide to give 34 gms. of 2-vinyl furan.

When a molecularly equivalent amount of m-nitrobenzaldehyde is substituted in the above example, a lacetone having the formula:

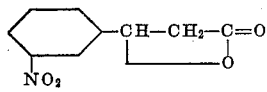

is produced. Similarly, 5-methyl-2-furfural and copper benzoate can be used.

*Example III.—β-phenyl-β-propionolactone*

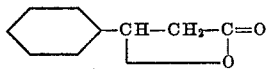

A solution of 2 gms. of mercuric acetate in 200 gms. of benzaldehyde was prepared, and ketene was passed into the solution through a hollow, high-speed stirrer while the temperature was held at 45° C. After a total of 2 moles (84 gms.) of ketene had been added, the reaction mixture consisted largely of β-phenyl-β-propionolactone. As a measure of the lactone formed, the reaction mixture was refluxed at atmospheric pressure for 30 minutes, during which time carbon dioxide was copiously evolved. On distillation 41 gms. of styrene, boiling at 143–144° C., were obtained.

By substituting molecularly equivalent amounts of o-, m-, and p-chlorobenzaldehydes, o-, m- and p-methylbenzaldehydes, etc. in the above examples, other β-lactones can be prepared.

*Example IV.—β-(2-furyl)-β-propionolactone*

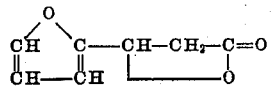

A solution of 1 gm. of cobalt isobutyrate (prepared by heating cobalt carbonate with isobutyric acid, and evaporating the mixture to dryness) in 200 gms. of freshly-distilled furfural was prepared, and ketene was passed into the solution through a hollow, high-speed stirrer for eight hours at the rate of 0.25 moles per hour. The exothermic nature of the reaction was sufficient to maintain a temperature of about 40° C. throughout the addition of the ketene. The reaction mixture consisted largely of β-(2-furyl)-β-propionolactone. As a measure of the amount of lactone formed, the reaction mixture was distilled at atmospheric pressure, and 34 gms. of 2-vinyl furan were obtained as a distillate. When the residue was sublimed under reduced pressure, 43 gms. of β-furyl-acrylic acid were isolated.

By substituting a molecularly equivalent amount of 5-chloro-2-furfural in the above example, a lactone having the formula:

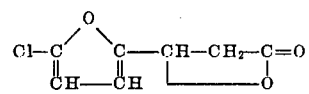

can be obtained.

*Example V.—β-(2-furyl)-β-propionolactone*

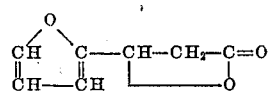

A solution of 1 gm. of zinc butyrate in 200 gms. of furfural was prepared, and ketene was passed into the solution through a hollow, high-speed stirrer for eight hours at the rate of 0.23 moles per hour. The reaction was sufficiently exothermic to maintain the reaction mixture at a temperature of from 30–40° C. The reaction mixture consisted largely of β-(2-furyl)-β-propionolactone. As a measure of the amount of β-lactone formed, the reaction mixture was distilled at atmospheric pressure, and 27 gms. of 2-vinyl furan were obtained.

By substituting a molecularly equivalent amount of 2-naphthaldehyde in the above example in a molecularly equivalent amount, a lactone having the formula:

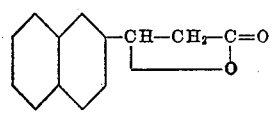

can be obtained.

In a similar manner other ketenes, aldehydes, or salts of carboxylic acids can be substituted in the above examples in accordance with the process of my invention. For example, when dimethyl ketene is passed into a solution of 1 gm. of calcium isobutyrate in 200 gms. of p-propylbenzaldehyde, a lactone having the formula:

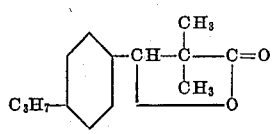

can be obtained.

The following example illustrates the condensation of ketene with furfural when temperatures outside the range of 30–60° C., and no catalyst, are used. The yield of β-lactone is less than half that obtained when the β-lactone is prepared in accordance with my process.

Example VI.—β-(2-furyl)-β-propionolactone

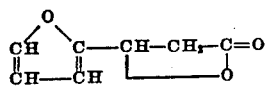

300 cc. (approx. 348 gms.) of freshly distilled furfural were chilled to 0–4° C. and ketene was passed in through a hollow, high-speed stirrer while the temperature was maintained within this range. The passage of ketene was continued until a total of 2 moles (84 gms.) had been added. The reaction mixture contained β-(2-furyl)-β-propionolactone, which was decarboxylated by distilling the reaction mixture under atmospheric pressure. Fifteen (15) grams of 2-vinyl furan were obtained as a distillate.

Although in the above examples, I decarboxylate the β-lactones formed by distilling the crude reaction mixture under atmospheric pressure, advantageously I can hydrolyze the crude reaction mixture by heating with an aqueous solution of an acid or base to produce the corresponding β-hydroxy acid. On distillation this acid is dehydrated to produce a derivative of an acrylic acid. The overall reaction may be illustrated as follows for β-(2-furyl)-β-propionolactone:

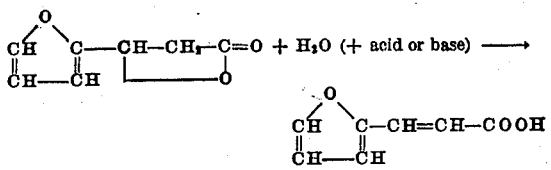

The crude reaction mixture can also be reduced if desired, in the presence of a suitable hydrogenation catalyst, such as Raney nickel, to form the corresponding β-substituted propionic acid. This reaction can be illustrated as follows:

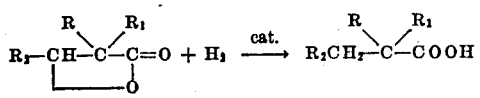

wherein R, R₁, and R₂ have the meanings given above.

The β-lactones produced in accordance with my invention are valuable intermediates in the preparation of synthetic polymers and resins, unsaturated and saturated acids and unsaturated and saturated esters.

I claim:

1. A process for preparing a β-lactone which comprises reacting at a temperature of from 30°–60° C. a ketene represented by the formula:

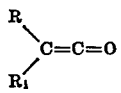

wherein R and R₁ each represents a member selected from the group consisting of a hydrogen atom, an alkyl group of the formula $C_nH_{2n+1}$ wherein $n$ is a positive integer from 1 to 4, an aryl group of the benzene series, and an aryl group of the naphthalene series with an aldehyde represented by the formula:

wherein R₂ represents a member selected from the group consisting of an aryl group having from 6 to 10 carbon atoms and a 2-furyl group, in the presence of from 0.1–3 per cent by weight, based on the combined weights of the ketene and the aldehyde of a monocarboxylic acid salt of a member selected from the group consisting of barium, calcium, mercury, zinc, nickel, cobalt, and copper.

2. A process for preparing a β-lactone which comprises reacting at a temperature of from 40°–60° C. a ketene represented by the formula:

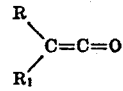

wherein R and R₁ each represents a member selected from the group consisting of a hydrogen atom, an alkyl group of the formula $C_nH_{2n+1}$ wherein $n$ is a positive integer from 1 to 4, an aryl group of the benzene series, and an aryl group of the naphthalene series with an aldehyde represented by the formula:

wherein R₂ represents a member selected from the group consisting of an aryl group having from 6 to 10 carbon atoms and a 2-furyl group, in the presence of from 0.1–3 per cent by weight, based on the combined weights of the ketene and the aldehyde of a monocarboxylic acid salt of a member selected from the group consisting of barium, calcium, mercury, zinc, nickel, cobalt, and copper.

3. A process for preparing a β-lactone which comprises reacting at a temperature of from 30°–60° C. a ketene represented by the formula:

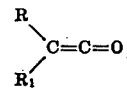

wherein R and R₁ each represents a member selected from the group consisting of a hydrogen atom, an alkyl group of the formula $C_nH_{2n+1}$ wherein $n$ is a positive integer from 1 to 4, an aryl group of the benzene series, and an aryl group of the naphthalene series with an aldehyde represented by the formula:

wherein R₂ represents a member selected from the group consisting of an aryl group having from 6 to 10 carbon atoms and a 2-furyl group, in the presence of from 0.3–2 per cent by weight, based on the combined weights of the ketene and the aldehyde of a monocarboxylic acid salt of a member selected from the group consisting of barium, calcium, mercury, zinc, nickel, cobalt, and copper.

4. A process for preparing a β-lactone which comprises reacting at a temperature of from 40°–60° C. a ketene represented by the formula:

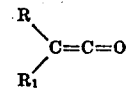

wherein R and R₁ each represents a member selected from the group consisting of a hydrogen atom, an alkyl group of the formula $C_nH_{2n+1}$ wherein $n$ is a positive integer from 1 to 4, an aryl group of the benzene series, and an aryl group of the naphthalene series with an aldehyde represented by the formula:

wherein R₂ represents a member selected from the group consisting of an aryl group having from 6 to 10 carbon atoms and a 2-furyl group, in the presence of from 0.3-2 per cent by weight, based on the combined weights of the ketene and the aldehyde of a monocarboxylic acid salt of a member selected from the group consisting of barium, calcium, mercury, zinc, nickel, cobalt, and copper.

5. A process for preparing a β-lactone which comprises reacting at a temperature of from 30°–60° C. a ketene represented by the formula:

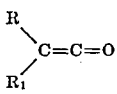

wherein R and R₁ each represents a member selected from the group consisting of a hydrogen atom, an alkyl group of the formula $C_nH_{2n+1}$ wherein $n$ is a positive integer from 1 to 4, an aryl group of the benzene series, and an aryl group of the naphthalene series with an aldehyde represented by the formula:

wherein R₂ represents a member selected from the group consisting of an aryl group having from 6 to 10 carbon atoms and a 2-furyl group, in the presence of from 0.1-3 per cent by weight, based on the combined weights of the ketene and the aldehyde of an aliphatic monocarboxylic acid salt of a member selected from the group consisting of barium, calcium, mercury, zinc, nickel, cobalt, and copper.

6. A process for preparing a β-lactone which comprises reacting at a temperature of from 30°–60° C. a ketene represented by the formula:

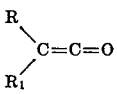

wherein R and R₁ each represents a member selected from the group consisting of a hydrogen atom, an alkyl group of the formula $C_nH_{2n+1}$ wherein $n$ is a positive integer from 1 to 4, an aryl group of the benzene series, and an aryl group of the naphthalene series with an aldehyde represented by the formula:

wherein R₂ represents a 2-furyl group, in the presence of from 0.1-3 per cent by weight, based on the combined weights of the ketene and the aldehyde, of a monocarboxylic acid salt of a member selected from the group consisting of barium, calcium, mercury, zinc, nickel, cobalt, and copper.

7. A process for preparing a β-lactone which comprises reacting at a temperature of from 30°–60° C. ketene (CH₂=C=O) with an aldehyde represented by the formula:

wherein R₂ represents a 2-furyl group in the presence of from 0.1-3 per cent by weight, based on the combined weights of the ketene and the aldehyde of a monocarboxylic acid salt of a member selected from the group consisting of barium, calcium, mercury, zinc, nickel, cobalt and copper.

8. A process for preparing a β-lactone which comprises reacting ketene (CH₂=C=O) at a temperature of from 30°–60° C. with an aldehyde represented by the formula:

wherein R₂ represents a member selected from the group consisting of an aryl group containing from 6 to 10 carbon atoms and a 2-furyl group, in the presence of from 0.1-3 per cent by weight, based on the combined weights of the ketene and aldehyde, of a monocarboxylic acid salt of a member selected from the group consisting of barium, calcium, mercury, zinc, nickel, cobalt, and copper.

9. A process for preparing a β-lactone which comprises reacting ketene (CH₂=C=O) at a temperature of from 30°–60° C. with an aldehyde represented by the formula:

$$R_2-C=O$$
$$\phantom{R_2-C}H$$

wherein R₂ represents a member selected from the group consisting of an aryl group containing from 6 to 10 carbon atoms and a 2-furyl group, in the presence of from 0.1-3 per cent by weight, based on the combined weights of the ketene and the aldehyde, of an aliphatic monocarboxylic acid salt of a member selected from the group consisting of barium, calcium, mercury, zinc, nickel, cobalt, and copper.

10. A process for preparing β-(2-furyl)-β-propionolactone having the formula:

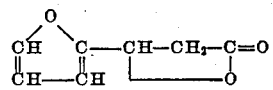

which comprises reacting ketene (CH₂=C=O) at a temperature of from 30°-60° C. with furfural in the presence of from 0.1-3 per cent by weight, based on the combined weights of the ketene and the aldehyde, of a monocarboxylic acid salt of a member selected from the group consisting of barium, calcium, mercury, zinc, nickel, cobalt, and copper.

11. A process for preparaing β-phenyl-β-propionolactone having the formula:

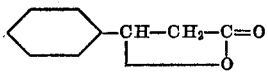

which comprises reacting ketene (CH₂=C=O) at a temperature of from 30°-60° C. with benzaldehyde in the presence of from 0.1-3 per cent by weight, based on the combined weights of the ketene and the aldehyde, of a monocarboxylic acid salt of a member selected from the group consisting of barium, calcium, mercury, zinc, nickel, cobalt, and copper.

12. A process for preparing β-(2-furyl)-β-propionolactone having the formula:

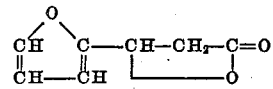

which comprises reacting ketene (CH₂=C=O) at a temperature of from 30°-60° C. with furfural in the presence of from 0.1-3 per cent by weight, based on the combined weights of the ketene and the aldehyde, of nickel butyrate.

13. A process for preparing β-(2-furyl)-β-propionolactone having the formula:

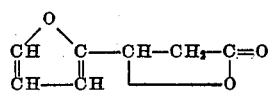

which comprises reacting ketene (CH₂=C=O) at a temperature of from 30°-60° C. with furfural in the presence of from 0.1-3 per cent by weight, based on the combined weights of the ketene and the aldehyde, of cobalt isobutyrate.

14. A process for preparing β-phenyl-β-propionolactone having the formula:

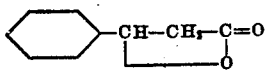

which comprises reacting ketene ($CH_2=C=O$) at a temperature of from 30°–60° C. with benzaldehyde in the presence of from 0.1–3 per cent by weight, based on the combined weights of the ketene and the aldehyde, of mercuric acetate.

15. A process for preparing a β-lactone which comprises reacting at a temperature of from 30°–60° C. a ketene represented by the formula:

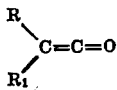

wherein R and $R_1$ each represents a member selected from the group consisting of a hydrogen atom, an alkyl group having the formula $C_nH_{2n+1}$ wherein $n$ is a positive integer from 1 to 4, an aryl group of the benzene series and an aryl group of the naphthalene series with an aldehyde represented by the formula:

wherein $R_2$ represents a member selected from the group consisting of an aryl group having from 6 to 10 carbon atoms and a 2-furyl group, at a temperature of from 40–60° C. in the presence of 0.1–3% by weight, based on the total weight of the ketene and aldehyde used, of a monocarboxylic acid salt of a member selected from the group consisting of barium, calcium, mercury, zinc, nickel, cobalt, and copper.

16. A process for preparing a β-lactone which comprises reacting at a temperature of from 30°–60° C. a ketene represented by the formula:

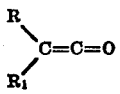

wherein R and $R_1$ each represents a member selected from the group consisting of a hydrogen atom, an alkyl group having the formula $C_nH_{2n+1}$ wherein $n$ is a positive integer from 1 to 4, an aryl group of the benzene series and an aryl group of the naphthalene series with an aldehyde represented by the formula:

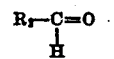

wherein $R_2$ represents an aryl group having from 6 to 10 carbon atoms, in the presence of from 0.1–3 per cent by weight, based on the combined weights of the ketene and the aldehyde, of a monocarboxylic acid salt of a member selected from the group consisting of barium, calcium, mercury, zinc, nickel, cobalt, and copper.

17. A process for preparing a β-lactone which comprises reacting at a temperature of from 30°–60° C. a ketene represented by the formula:

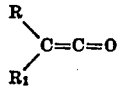

wherein R and $R_1$ each represents a member selected from the group consisting of a hydrogen atom, an alkyl group having the formula $C_nH_{2n+1}$ wherein $n$ is a positive integer from 1 to 4, an aryl group of the benzene series and an aryl group of the naphthalene series with an aldehyde represented by the formula:

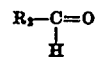

wherein $R_2$ represents an aryl group having from 6 to 10 carbon atoms, in the presence of from 0.1–3 per cent by weight, based on the combined weights of the ketene and the aldehyde, of an aliphatic monocarboxylic acid salt of a member selected from the group consisting of barium, calcium, mercury, zinc, nickel, cobalt, and copper.

HUGH J. HAGEMEYER, Jr.

REFERENCES CITED

The following references are of record in the file of this patent:

UNITED STATES PATENTS

| Number | Name | Date |
|---|---|---|
| 2,424,590 | Steadman et al. | July 29, 1947 |